United States Patent
Walczak et al.

(10) Patent No.: US 6,638,150 B2
(45) Date of Patent: Oct. 28, 2003

(54) WORKPIECE HOLDER FOR A MACHINING APPARATUS AND A CORRESPONDING CROSS-CUT MACHINE

(75) Inventors: Erich Walczak, Aachen (DE); Dirk Hessberger, Aachen (DE); Karlheinz Grouls, Herzogenrath (DE)

(73) Assignee: Schumag AG, Aachen (DE)

( * ) Notice: Subject to any disclaimer, the term of this patent is extended or adjusted under 35 U.S.C. 154(b) by 4 days.

(21) Appl. No.: 09/899,757

(22) Filed: Jul. 5, 2001

(65) Prior Publication Data

US 2002/0028642 A1 Mar. 7, 2002

(30) Foreign Application Priority Data

Jul. 4, 2000 (DE) .......................................... 100 31 797

(51) Int. Cl.$^7$ ................................................. B24B 9/00
(52) U.S. Cl. ....................... 451/65; 451/331; 451/365; 265/43; 409/173; 198/468.01; 198/478.1
(58) Field of Search .................. 451/65, 336, 331, 451/334, 332, 364, 365, 403; 269/25, 37, 43, 86; 409/172, 173; 198/468.01, 469.1, 470.1, 478.1

(56) References Cited

U.S. PATENT DOCUMENTS

| | | | | |
|---|---|---|---|---|
| 86,817 A | * | 2/1869 | Crosby ........................ 451/130 |
| 2,572,374 A | * | 10/1951 | Oas et al. .................... 198/544 |
| 2,584,587 A | * | 2/1952 | Huyet ......................... 198/625 |
| 2,813,381 A | * | 11/1957 | Narel ........................... 451/246 |
| 2,864,412 A | | 12/1958 | Ponder | |
| 3,160,996 A | * | 12/1964 | Dunn .......................... 451/336 |
| 4,079,551 A | * | 3/1978 | Bando ......................... 451/260 |
| 4,100,715 A | * | 7/1978 | Ganz ........................... 53/48.7 |
| 4,364,696 A | | 12/1982 | Syarto | |
| 4,387,500 A | * | 6/1983 | Weresch ........................ 140/1 |
| 4,792,075 A | * | 12/1988 | Umlauf ........................ 226/172 |
| 4,842,127 A | * | 6/1989 | Zenker ........................ 198/712 |
| 4,881,633 A | * | 11/1989 | Cailey et al. ............. 198/345.1 |
| 5,125,140 A | * | 6/1992 | Sticht ....................... 198/860.2 |
| 5,168,657 A | * | 12/1992 | Yoshida ....................... 451/282 |
| 5,450,946 A | * | 9/1995 | Sticht ....................... 198/465.1 |
| 5,705,043 A | * | 1/1998 | Zwerner et al. ............ 204/202 |
| 5,791,972 A | * | 8/1998 | Murasugi et al. ............. 451/28 |
| 5,979,038 A | * | 11/1999 | Nelson et al. .......... 144/250.14 |
| 6,206,763 B1 | * | 3/2001 | Mackall ........................ 451/51 |
| 6,354,582 B1 | * | 3/2002 | Hafer et al. .............. 270/58.07 |

FOREIGN PATENT DOCUMENTS

| EP | 0 254 028 A | 1/1988 |
|---|---|---|
| FR | 2 227 934 A | 11/1974 |

* cited by examiner

Primary Examiner—Joseph J. Hail, III
Assistant Examiner—Hadi Shakeri
(74) Attorney, Agent, or Firm—Henry M. Feiereisen

(57) ABSTRACT

For retrofitting conventional machining apparatuses, in particular cross-cut machines, with a workpiece holder, the invention proposes a workpiece holder with at least one continuous clamping chain that is provided on one side with a plurality of clamping jaws.

19 Claims, 4 Drawing Sheets

WORKPIECE HOLDER FOR A MACHINING APPARATUS AND A CORRESPONDING CROSS-CUT MACHINE

BACKGROUND OF THE INVENTION

Figure 1:
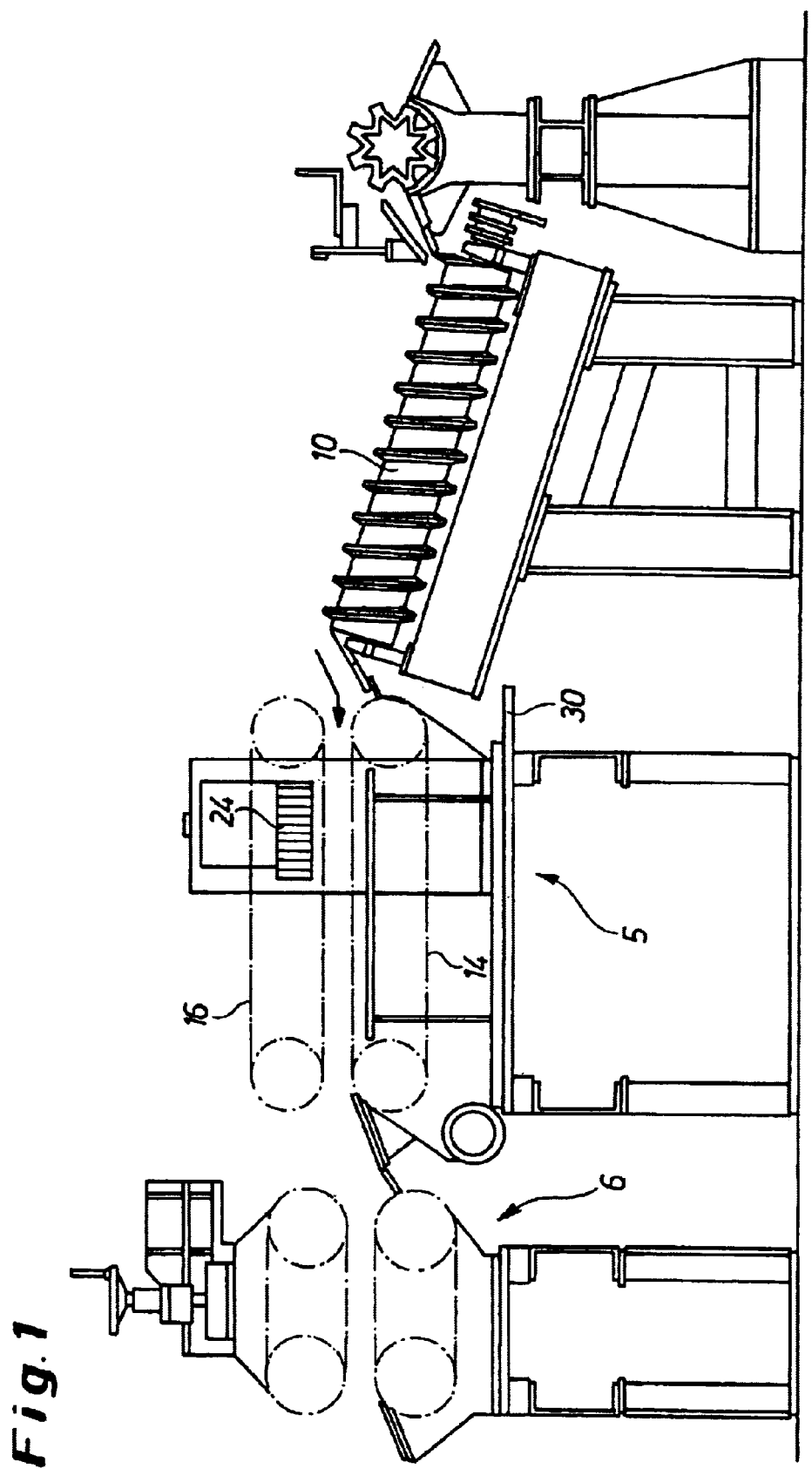

The invention relates to a workpiece holder for a machining apparatus, wherein a succession of workpieces is supplied to a least one machining unit and wherein during the machining operation each workpiece is held by the workpiece holder, as well as a machining apparatus having such a workpiece holder.

Different forms, sizes and designs of workpiece holders of the aforedescribed type are known in the art. In particular, workpiece holders are known which have active gripping arms and receive workpieces from a feed unit, hold the workpieces during the machining operation, and subsequently transfer the workpieces to a transport device. Although these workpiece holders have proven successful in practice, they are expensive difficult to maintain due to their moveable active gripping arms. In addition, the conventional workpiece holders come to a stop at the machining unit to allow machining of the workpiece. This limits the throughput of machining apparatuses equipped with corresponding workpiece holders.

In certain applications, the form and structure of the workpiece is not machined, so that the workpiece does not have to be held in a precisely defined position relative to the machining unit. This may be the case where, for example, the workpiece is only cleaned or filled. These applications can be found, for example in the beverage industry, wherein workpieces, such as bottles, are continuously moved past a processing unit, for example a filling machine or a cleaning machine. Here conventional transport units can be used, where in general the position of the workpiece relative to the processing unit does not have to be accurately established. However, if it becomes necessary to fix the position, then the processing unit itself can be provided with grippers which grip the workpiece and hold the workpiece in place for the duration of the operation. Such devices allow a very high throughput, but tend to have rather complex mechanisms. Moreover, such devices cannot be easily employed in or added to conventional machining apparatuses, in particular milling machines, saws or chamfering machines.

It is therefore an object of the invention to provide a workpiece holder that can also be easily employed with and added to simple conventional machining apparatuses, in particular cross-cut machines that include milling and sawing tools, and that provides a high throughput.

SUMMARY OF THE INVENTION

The object is solved by a workpiece holder for a machining apparatus of the aforedescribed type, in which at least one continuous clamping chain with a plurality of clamping jaws is provided.

By using a workpiece holder designed in this way, workpieces from a corresponding feed unit can be received continuously using the clamping jaws and guided past a machining unit, such as a saw or milling machine, without a need to stop the machining operation. It should be noted, that a continuous belt, similar to a conveyor belt, can also be used instead of the continuous chain. In the simplest embodiment, it may be sufficient to employ only a single clamping jaw.

The clamping jaw can be an active clamping jaw with moveable clamping elements. However, a passive clamping jaw is preferable due to its simpler design, ease of maintenance and inexpensive manufacture. In this case, the clamping action is effected solely by, for example, guiding of the clamping chain along a slide rail disposed opposite the open side of the clamping jaws.

The clamping chain can be guided and driven in various ways. Preferably, the workpiece holder includes drive and guide means in the form of two cylinders that drive and guide the clamping chain along a predefined pathway. If a slide rail which acts as a counter pressure element is provided along the region of the pathway, where the workpiece to be machined has to be securely clamped, then the workpiece holder needs only have a single clamping chain.

In a preferred embodiment, the workpiece holder includes two clamping chains with complementary clamping jaws. Under normal operating conditions of the workpiece holder, the two clamping chains move in opposite directions and parallel to one another along a section of the respective path, thereby providing a secure support of the workpiece to be machined along this section. A workpiece holder implemented in this way not only provides an especially high throughput, but—in cooperation with suitably formed feed means—also grips and guides the workpieces so as to prevent the workpieces from being damaged. The clamping chains can revolve continuously, so that the workpiece holder does not have to be constantly braked and then again accelerated, which improves its durability.

According to another preferred embodiment of the invention, pressing means can be provided that press the clamping jaws towards a workpiece along a machining path. The pressing means can have any form that is optimized for the respective application. In particular with cross-cut machines, it has proven advantageous to implement the pressing means in form a pressing rail. The pressing rail can be formed so that the pressure exerted on the clamping jaws is variable. This arrangement allows, for example, workpieces with different diameters and/or different friction coefficients to be securely held by the clamping jaws without damaging the workpiece.

If the pressure exerted by the pressing rail on the clamping jaws is to be variable, then the pressing rail is preferably designed so as to be formed of a plurality of pressing elements, wherein each pressing element can be pre-biased and/or moved towards the clamping jaws using its own mechanical, hydraulic or pneumatic pressing means, in particular springs. The pressing elements can be arranged in an overlapping fashion, so that the resulting pressure that is applied via partitioned rams using the individual pressing means is uniform. The pressing elements can be used to apply a preferably variable pressure to each revolving clamping jaw, thereby optionally forming a feed and discharge region with a low pressing force and a holding region with a high pressing force. The pressing force can also be varied from location to location during the machining operation depending on the specific machining task.

In another preferred embodiment, each clamping jaw has at least two clamping pockets, preferably with different profiles. These pockets can be formed, for example, as recesses with different apex angles, e.g., 90° and 120°, so that such clamping jaw can be used to grip and clamp round profiles as well as hexagonal and rectangular profiles.

DETAILED DESCRIPTION OF PREFERRED EMBODIMENTS

Figure 2:
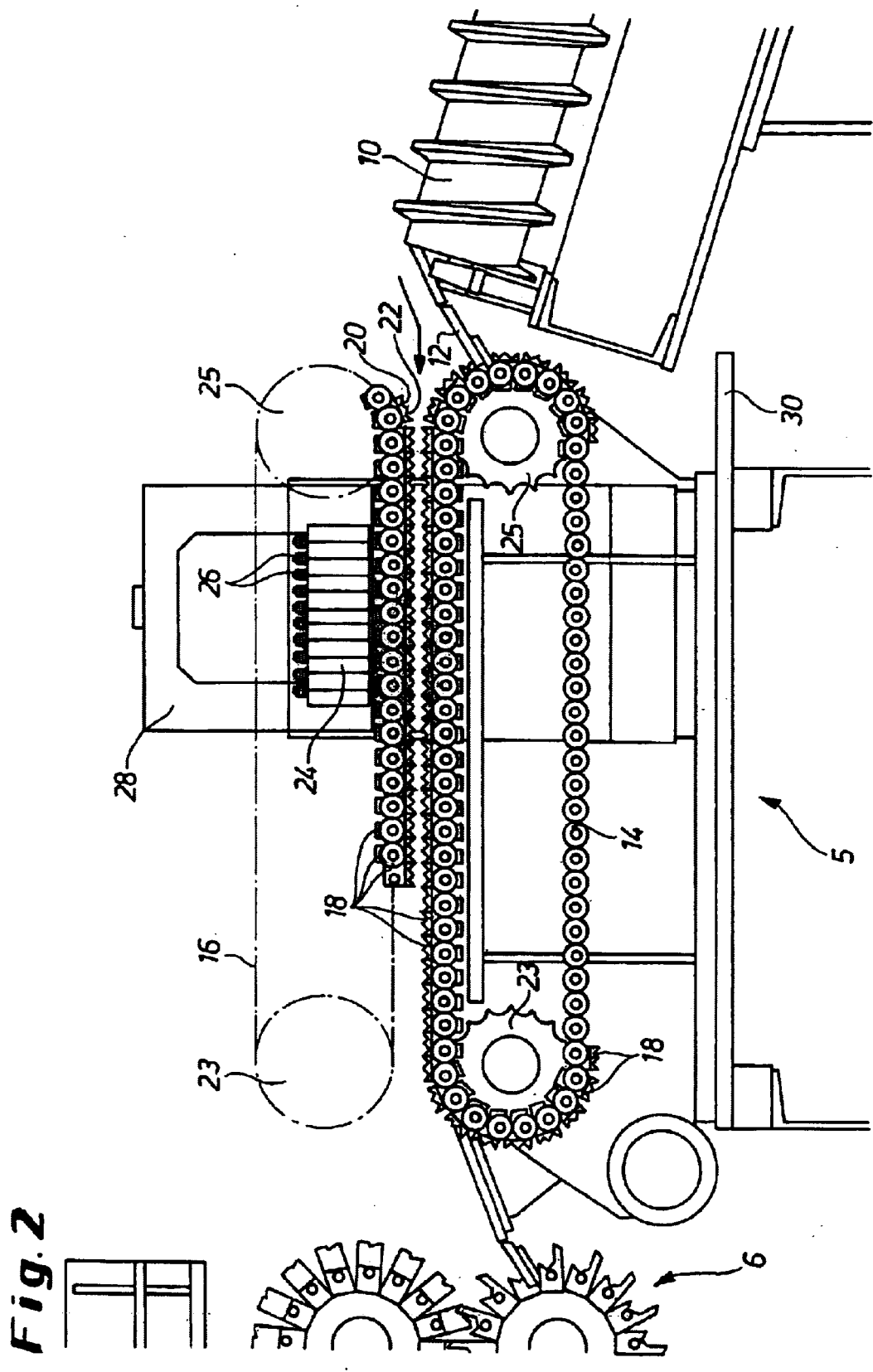
Figure 3:
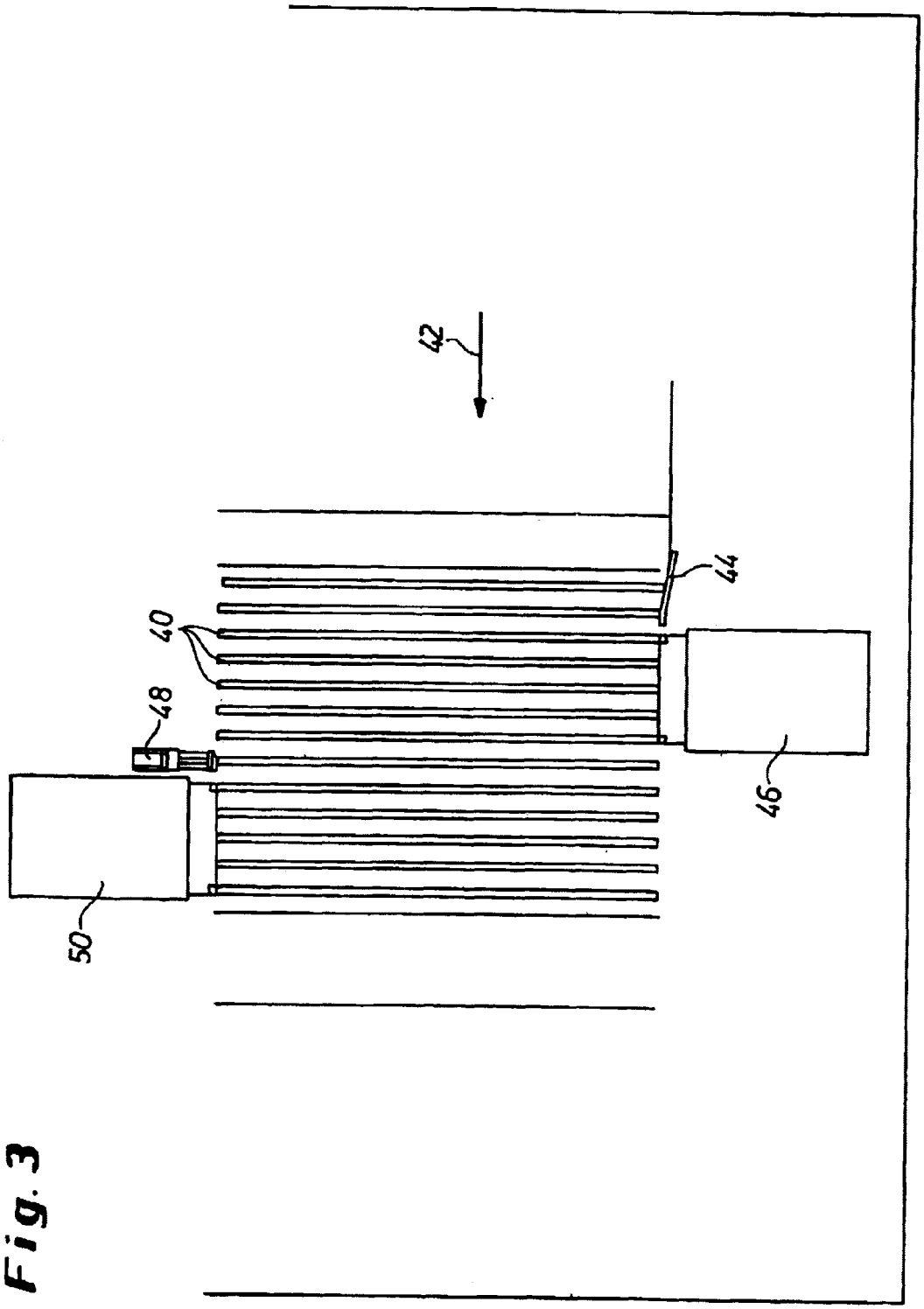
Figure 4:
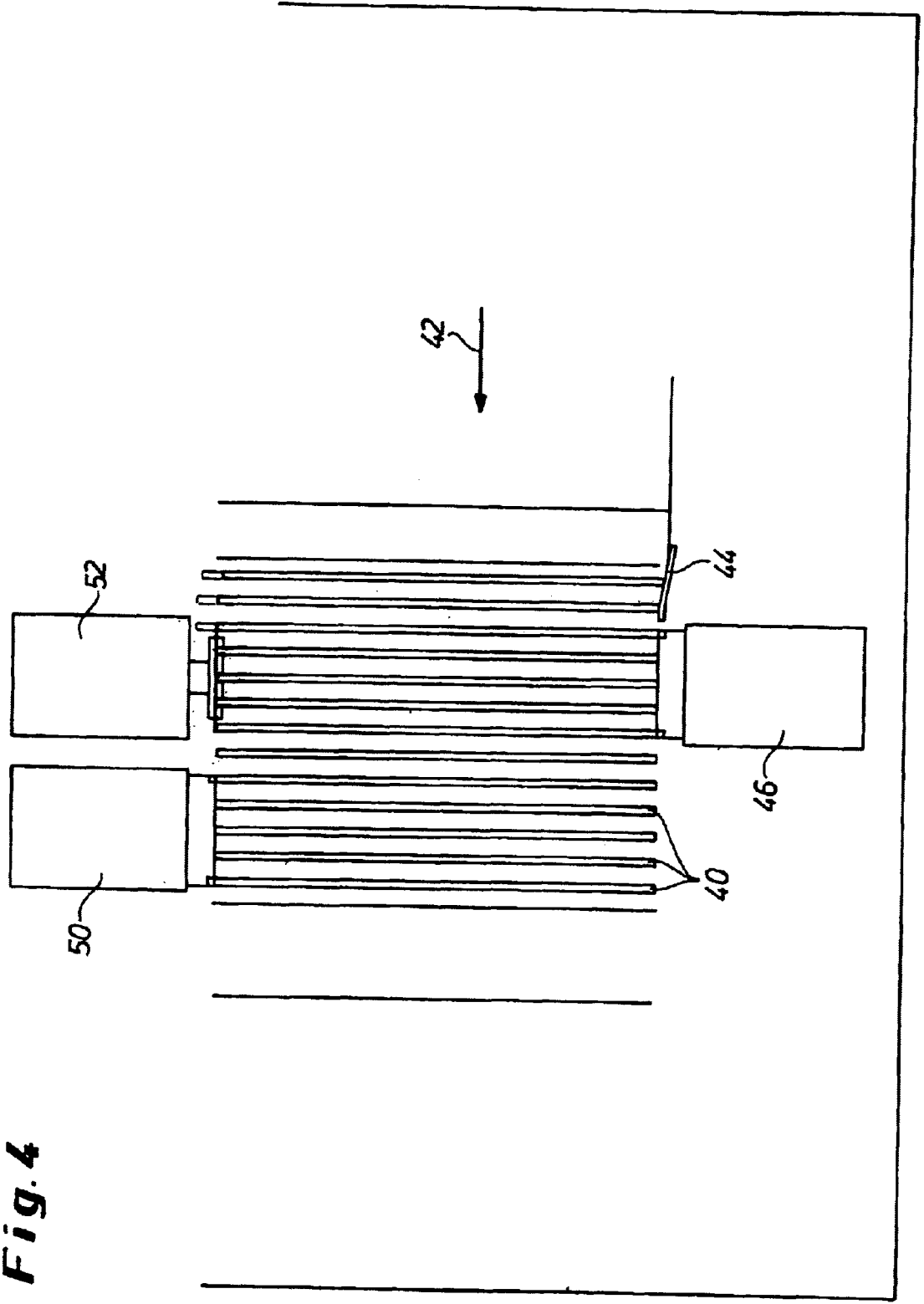

Additional details and advantages of the invention are described in the exemplary embodiment of the invention and in the accompanying drawing. It is shown in:

FIG. 1 a schematic diagram of a machining apparatus with a workpiece holder according to the invention, FIG. 2 an enlarged detail of FIG. 1, FIG. 3 a schematic top view of a clamping chain according to the invention that is guided past two machining units, and FIG. 4 a schematic top view of a clamping chain according to the invention that is guided past three machining units.

FIGS. 1 and 2 depict a machining apparatus wherein a feed screw 10 that feeds the workpieces, is employed to feed the workpieces to be processed via a slide 12 to a workpiece holder 5 having two revolving clamping chains 14 and 16 which are only partially shown. The workpiece holder 5 includes drive and guide means in the form of cylinders 23, 25 that drive and guide the clamping chains 14, 16 along a predefined pathway. Each clamping chain 14 and 16 includes a number of clamping jaws 18. The reference numerals of most clamping jaws have been omitted for sake of clarity. In this embodiment, the two clamping chains 14 and 16 have an identical length, and each clamping jaw of the upper clamping chain 16 is associated with a respective clamping jaw of the lower chain 14. It should be noted that this feature is not necessarily required, since if a secure clamping action is required only during a relatively short processing path, then one of the two clamping chains can be formed to be active only along the short machining path, whereas the other of the two clamping chains can be longer and can operate following the processing path as a transport belt on which the processed workpieces are loosely supported.

In this embodiment, each clamping jaw 18 has clamping pockets 20 and 22 which—when viewed from the side—have a triangular profile with different apex angles.

To effect a particularly secure clamping action in the machining region, a pressing rail 24 is provided in this embodiment which is made of individual pressing elements that are biased by springs 26.

The machining unit, past which the workpieces are continuously guided by the workpiece holder, can be, for example, a milling machine 28 disposed on a support plate 30.

As indicated in FIGS. 3 and 4, workpieces 40 that are supplied to the workpiece holder, for example, via the slide shown in FIG. 2, be guided past different processing units in a feed direction 42 using a single workpiece holder. Advantageously, a centering aid 44 can be provided in the region where the workpieces 40 transition from the slide to the workpiece holder. The workpieces are then gripped by the clamping jaws of the workpiece holder and guided past a first processing unit, for example a milling machine 46, whereafter the workpieces move to a positioning device 48 and subsequently past a second milling machine 50. In this way, both ends of the workpieces 40 which in the illustrated example are elongated tubular or rod-shaped, can be machined.

In FIG. 4, the workpieces are guided past three processing units, namely the aforedescribed milling machines 46 and 50 and a saw 52.

While the invention has been disclosed in connection with the preferred embodiments shown and described in detail, various modifications and improvements of the clamping jaws will become readily apparent to those skilled in the art. In particular, instead of the illustrated clamping jaws with two clamping pockets, clamping jaws with three or more clamping pockets can be employed.

What is claimed is:

1. Workpiece holder for presenting a succession of workpieces to a machining unit and holding the workpieces during a machining operation performed by the machining unit, the workpiece holder comprising two continuous clamping chains, each of said clamping chains comprising a plurality of clamping jaws having clamping pockets, wherein the clamping pockets on a first clamping chain are arranged on the clamping chain so as to complement the clamping pockets on the other clamping chain and wherein the workpiece holder further includes a pressing means disposed alone a machining path and pressing said first clamping chain in a direction towards said other clamping chain, whereby each pair of the complementing clamping pockets is configured to clamp a separate workpiece from the succession of workpieces.

2. The workpiece holder of claim 1, further comprising drive and guide means which move the clamping chain along a predefined pathway.

3. The workpiece holder of claim 1, wherein two clamping chains are provided and wherein the clamping jaws on a first clamping chain are arranged so as to complement the clamping jaws on the other clamping chain.

4. The workpiece holder according to claim 1, further including pressing means disposed along a machining path that press the clamping jaws in a direction towards a workpiece.

5. The workpiece holder of claim 4, wherein the pressing means include a pressing rail.

6. The workpiece holder of claim 5, wherein the pressing rail is formed so as to apply a variable pressure to the clamping jaws.

7. The workpiece holder of claim 6, wherein the pressing rail comprises a plurality of pressing elements.

8. The workpiece holder of claim 1, wherein each clamping jaw has at least two clamping pockets.

9. A machining apparatus, in particular a cross-cut machine, having a workpiece holder adapted to present a succession of workpieces to at least one machining unit and holding the workpieces during a machining operation performed by the at least one machining unit, the workpiece holder comprising a plurality of clamping jaws arranged on the clamping chain.

two continuous clamping chains, each of said clamping chains comprising a plurality of clamping jaws having clamping pockets, wherein the clamping pockets on a first clamping chain are arranged on the clamping chain so as to complement the clamping pockets on the other clamping chain and wherein the workpiece holder further includes a pressing means disposed along a machining oath and pressing said first clamping chain in a direction towards said other clamping chain, whereby each pair of the complementing clamping pockets is configured to clamp a separate workpiece from the succession of workpieces.

10. The machining apparatus of claim 9 having at least two machining units, wherein the workpiece holder is adapted to guide the workpieces past the at least two machining units.

11. The machining apparatus of claim 9, wherein two sequential workpiece holders are provided.

12. The machining apparatus of claim 9, further comprising a continuously operating feed device that feeds the workpieces to the workpiece holder.

13. The workpiece holder of claim 2, wherein the drive and guide means are implemented in form of two cylinders.

14. The workpiece holder of claim 7, wherein the pressing elements include individual pressing means selected from the group consisting of mechanical, hydraulic and pneumatic actuators, and springs.

15. The workpiece holder of claim 8, wherein the at least two clamping pockets-are provided with different profiles.

16. The machining apparatus of claim 12, wherein the feed device comprises a feed screw.

17. The workpiece holder of claim 1, wherein the clamping pockets comprise recesses having a profile that complements a profile of the separate workpiece so as to securely grip the separate workpiece.

18. The workpiece holder of claim 9, wherein the profile of the recesses comprises an apex angle of between 90° and 120°, and the profile of the separate workpiece is round, hexagonal or rectangular.

19. The workpiece holder of claim 18, wherein the profile of the recesses comprises an apex angle of between 90° and 120°, and the profile of the separate workpiece is round, hexagonal or rectangular.

* * * * *

UNITED STATES PATENT AND TRADEMARK OFFICE
CERTIFICATE OF CORRECTION

PATENT NO. : 6,638,150 B2
DATED : October 28, 2003
INVENTOR(S) : Erich Walczak, Dirk Hessberger and Karlheinz Grouls It is certified that error appears in the above-identified patent and that said Letters Patent is hereby corrected as shown below:

Column 4,
Line 13, change "alone" to -- along --;
Line 20, change "chain" to -- chains --;
Lines 22-29, delete claims 3 and 4 in their entirety;
Line 30, change "claim 4" to -- claim 1 --;
Lines 45 and 46, delete entirely;
Line 54, change "oath" to -- path --.

Column 5,
Line 8, change "pockets-are" to -- pockets are --;

Column 6,
Line 3, after "wherein" insert -- the clamping pockets comprise recesses having a profile that complements a profile of the separate workpiece so as to securely grip the separate workpiece and wherein --.

Signed and Sealed this

Sixteenth Day of August, 2005

JON W. DUDAS
*Director of the United States Patent and Trademark Office*